United States Patent [19]

Rosswurm et al.

[11] Patent Number: 4,998,103

[45] Date of Patent: Mar. 5, 1991

[54] ELECTROSTATIC POSITION SENSING ANGLE RESOLVER

[75] Inventors: Mark A. Rosswurm; William G. Wolber, both of Columbus, Ind.; Richard E. DeYoung, Oshkosh, Wis.

[73] Assignee: Cummins Electronics Company, Inc., Columbus, Ind.

[21] Appl. No.: 343,031

[22] Filed: Apr. 25, 1989

[51] Int. Cl.[5] .................... G08C 19/16; G08C 19/10
[52] U.S. Cl. ............................ 340/870.370; 324/688; 324/662
[58] Field of Search ............... 340/870.37, 686; 324/61 R, 61 P; 350/96.15; 73/764

[56] References Cited

U.S. PATENT DOCUMENTS

| | | | |
|---|---|---|---|
| 3,219,920 | 11/1965 | Wall | 324/88 |
| 3,674,933 | 7/1972 | Baum et al. | 178/69 B |
| 3,961,318 | 6/1976 | Farrand et al. | 340/870.37 |
| 3,962,911 | 6/1976 | Grenlund | 73/764 |
| 4,040,041 | 8/1977 | Fletcher et al. | 340/870.37 |
| 4,092,579 | 5/1978 | Weit | 318/622 |
| 4,122,708 | 10/1978 | Maier | 73/862.34 |
| 4,238,781 | 12/1980 | Vercellotti et al. | 340/870.37 |
| 4,360,771 | 11/1982 | Grenlund | 320/61 |
| 4,402,524 | 9/1983 | D'Antonio et al. | 280/612 |
| 4,418,348 | 11/1983 | Tanaka et al. | 340/870.37 |
| 4,435,702 | 3/1984 | Imai | 340/671 |
| 4,525,025 | 6/1985 | Hohmann et al. | 350/96.15 |
| 4,527,073 | 7/1985 | Carroll | 307/90 |
| 4,550,618 | 11/1985 | Kohama et al. | 73/862.34 |
| 4,742,475 | 5/1988 | Juengel | 340/870.37 |
| 4,862,752 | 9/1989 | Hoyt | 73/862.34 |

FOREIGN PATENT DOCUMENTS

| | | |
|---|---|---|
| 2071852 | 9/1981 | United Kingdom . |
| 2133889 | 8/1984 | United Kingdom .......... 340/870.37 |

OTHER PUBLICATIONS

"Improved Capacitive Transducer for Animal Movements", L. Van Den Steen R. A. P. Vanwersch, 7/81, Med & Biol Eng. & Comput., p. 479.

Primary Examiner—Donald J. Yusko
Assistant Examiner—Yuk H. Lau
Attorney, Agent, or Firm—Woodard, Emhardt, Naughton, Moriarty & McNett

[57] ABSTRACT

An electrostatic angle resolver has a stator for producing a patterned electrostatic field, a rotor having sensivitity to the electrostatic field, a capacitive coupling providing a signal interconnection between the rotor and the stator, and an active shield supplied with a voltage signal substantially identical to that signal present on the stator thereby diminishing degradation in the strength of the signal coupled between the rotor and the stator.

9 Claims, 5 Drawing Sheets

ROTOR

Fig.2c

STATOR

ELECTROSTATIC POSITION SENSING ANGLE RESOLVER

BACKGROUND OF THE INVENTION

This invention relates to electrostatic transducers and more particularly to brushless printed circuit angle resolvers incorporating capacitive coupling techniques.

A number of prior art angle resolvers incorporate electrostatic coupling techniques to produce a signal indicative of angular position. One type of angle resolver is an electrostatic position transducer having the desirable features of flexibility in design configuration and low cost. The electrostatic angle resolver is essentially comprised of two variably shaped metallic plates rotated in opposition to each other to vary the plate surface area exposed between the two plates thereby creating a variable electrostatic field signal. The electrostatic charge acquired by the moving plate is reflected back to a stationary coupling or receiving plate and transformed into an electronic signal which, when analyzed reveals angular position or variations in angular position. Examples of such devices are shown in U.S. Pat. No. 4,092,579 to Wheit, U.S. Pat. No. 4,040,041 to Fletcher et al., U.S. Pat. No. 4,435,702 to Imai, U.S. Pat. No. 3,961,318 to Farrand et al., U.S. Pat. No. 4,418,348 to Tanaka et al., and U.S. Pat. No. 4,238,781 to Vercellotti et al.

Each of the devices disclosed in the above patents relies upon some form of external excitation. Additionally, it is likely in many applications that these devices will be used in and about metallic objects. As the rotor or stator become more closely located to a nearby metallic object, the quality or strength of the signal which is reflected from the rotor to the stator can be diminished due to the nearby grounded metallic object. Thus, a primary difficulty with the prior art in terms of location of an angle resolver depends upon the application site and nearby metallic objects. In order to avoid the interference caused by nearby metallic objects, the present invention includes a device for shielding the stator and rotor from nearby interferences so as to provide a higher quality signal and thus an improved signal for sensing angular position. By providing such shielding concepts, the present invention enables flexibility in the packaging of the angular resolver for each particular application, regardless of the proximity of metallic objects.

SUMMARY OF THE INVENTION

An angle resolver according to a typical embodiment of the invention includes a stator for producing a patterned electrostatic field, a rotor having means responsive to electrostatic field strength for producing a signal determined by the angular position of the rotor with respect to the stator, capacitive coupling means having a first capacitive element on the rotor and a second capacitive element not on the rotor, and an active shield for shielding at least a portion of the capacitive coupling means from nearby metallic objects. An active amplifier receives its input from the second capacitive element and supplies an output signal to the active shield.

One object of this invention is to provide an improved electrostatic angle resolver for determining angular position of a rotating member.

Another object of the present invention is to provide an angle resolver which produces a signal with a higher signal to noise ratio at an equal or substantially lower cost than prior art devices.

Another object of the present invention is to provide an angle resolver capable of providing highly accurate readings in regard to angular position with resolution of a very small angular increment.

Related objects and advantages of the present invention will be apparent from the following Description of the Preferred Embodiment.

BRIEF DESCRIPTION OF THE DRAWINGS

FIG. 2c is a front elevational view of the rotor surface X of FIG. 2b illustrating the configuration of the metallic plates of the rotor of the embodiment shown in FIG. 2a.

FIG. 2d is a front elevational view of the stator surface Y of FIG. 2b showing the metallic plate elements of the stator of the embodiment shown in FIG. 2a.

FIG. 3b is the opposite side of the circuit board shown in FIG. 3a.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
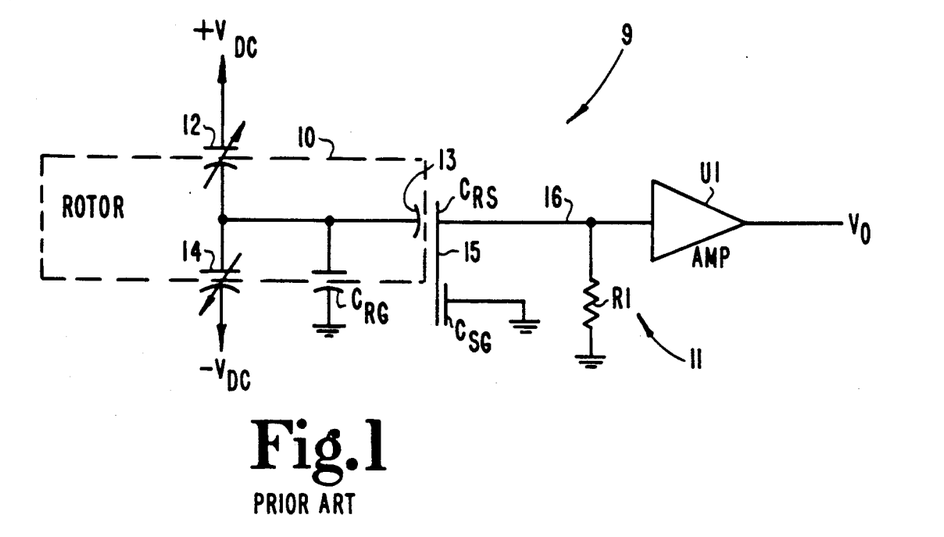
FIG. 1 is a schematic diagram of a prior art angle resolver showing a DC excited stator, a rotor, and stray capacitances.

An electrostatic angle resolver according to the prior art is shown in FIG. 1. Typically, the position sensors or angle resolvers of the prior art incorporate either AC or DC excitation. FIG. 1 depicts a DC excited angle resolver 9 utilizing a positive and negative DC voltage for excitation of the stator surfaces which make up one-half of the variable capacitors 12 and 14, i.e., one plate of variable capacitors 12 and 14 is dedicated or forms a part of the stator 11. The second plate of variable capacitors 12 and 14 resides on and is part of the rotor 10. An air dielectric separates the plates of capacitors 12 and 14, however, other materials may be interposed therein to vary the dielectric constant and alter the capacitance of capacitors 12 and 14, such as liquids or even combination dielectrics such as polymers and air combined. Portions of rotor 10 combine with other plates or surfaces to form two additional capacitors: $C_{RS}$, comprised of two plates, one residing on rotor 10 which is commonly referred to as the rotor coupling surface 13, and the second plate of $C_{RS}$ which is known in the art as the stator coupling surface 15; and capacitor $C_{RG}$ commonly referred to as the rotor to ground capacitance formed by the capacitive coupling of the rotor 10 to nearby grounded metallic objects (not shown).

The rotor coupling surface 13 is connected to the rotor plate portions of variable capacitors 12 and 14. Rotor coupling surface 13 is also connected to the rotor plate making up half of capacitor $C_{RG}$. The remaining plate of capacitor $C_{RG}$ is comprised of nearby metallic objects (not shown) at or near ground potential. Capacitor $C_{RG}$ is a stray or distributed capacitance which interferes with the strength and quality of the signal present on rotor coupling surface 13. Interference attributable to capacitor $C_{RG}$ is easily understood by recalling that charged plates, in particular rotor coupling surface 13, will lose charge to nearby grounded metallic objects or ground plane objects as determined by formulas well known in the art regarding electrostatically charged objects and the E fields emanating therefrom.

Positioned opposite rotor coupling surface 13 is stator coupling surface 15, surfaces 13 and 15 together forming capacitor $C_{RS}$ (rotor to stator). The electrostatic charge signal generated by variable capacitors 12 and 14 is coupled to stator coupling surface 15 via rotor coupling surface 13. The input of amplifier U1 is connected to stator coupling surface 15. Amplifier U1 has a very high input impedance to prevent loading of the signal on input line 16 hereinafter referred to as signal 16. Amplifier U1 has an input resistor R1 to supply a path to ground for input bias currents emanating from U1 thereby preventing a static charge buildup on surface 15.

Another source of signal loss in electrostatic angle resolvers occurs due to the charge loss from stator coupling surface 15 to nearby grounded objects, schematically represented by capacitor $C_{SG}$ showing the capacitive coupling to ground of stator coupling surface 15. Capacitor $C_{SG}$ and $C_{RG}$ schematically represent effective shunt capacitances formed with nearby ground potential metallic objects which capacitors degrade the signals produced by angle resolvers of the prior art. A degradation in amplitude of signal 16 inherently lowers the signal to noise ratio and therefore lowers the quality of the signal produced at the output of U1, schematically indicated as voltage $V_O$.

Operationally, rotor 10, which is attached to a rotating member (not shown) has plates comprising one-half of capacitors 12 and 14 formed or shaped so that as rotor 10 rotates, the rotor 10 surfaces or plates of capacitors 12 and 14 vary in capacitance according to a periodic function, which signal may be a rounded-off square wave or near-sinusoidal waveform. The rotor plate of capacitor 12 is in opposite phase with respect to the rotor plate of capacitor 14, thereby causing the highest magnitude charge differential to occur at rotor coupling surface 13 due to superposition of the charges across capacitors 12 and 14. The oscillatory electrostatic charge present at rotor coupling surface 13 during rotation of rotor 10 is electrostatically transmitted or coupled via rotor coupling surface 13 to stator coupling surface 15 and supplied to the input of amplifier U1. Amplification of signal 16 by U1 provides a periodic signal. The zero crossings of signal 16 provide an indication of absolute angular positioning of the rotor 10 with respect to stator 11. Additionally, well known circuitry for determining the phase angle of signal 16 would enable higher resolution in regard to the angular position of rotor 10 with respect to stator 11.

An example of one possible use for an angle resolver as described above is in the measurement of torque on the crankshaft of an internal combustion engine. Two angle resolvers are used, one attached to each end of the crankshaft outside the engine. The output signals from each resolver are compared via phase discriminator circuits, which are well known in the art, to provide an indication of the elastic axial deformation of the crankshaft as the crankshaft rotates. The axial elastic deformation of the crankshaft, measured in degrees, bears a functional relationship to the torque load borne by the crankshaft at any given moment and hence can be used to infer instantaneous and average torque provided torque versus angular-stress data is known for the particular crankshaft.

Thus, the accuracy and resolution of a torque measurement in the example above depends upon the quality of signal 16 with regard to signal to noise ratio, which ratio ultimately determines the resolution with which signal 16 may indicate angular position of the rotor 10.

Figure 2A:
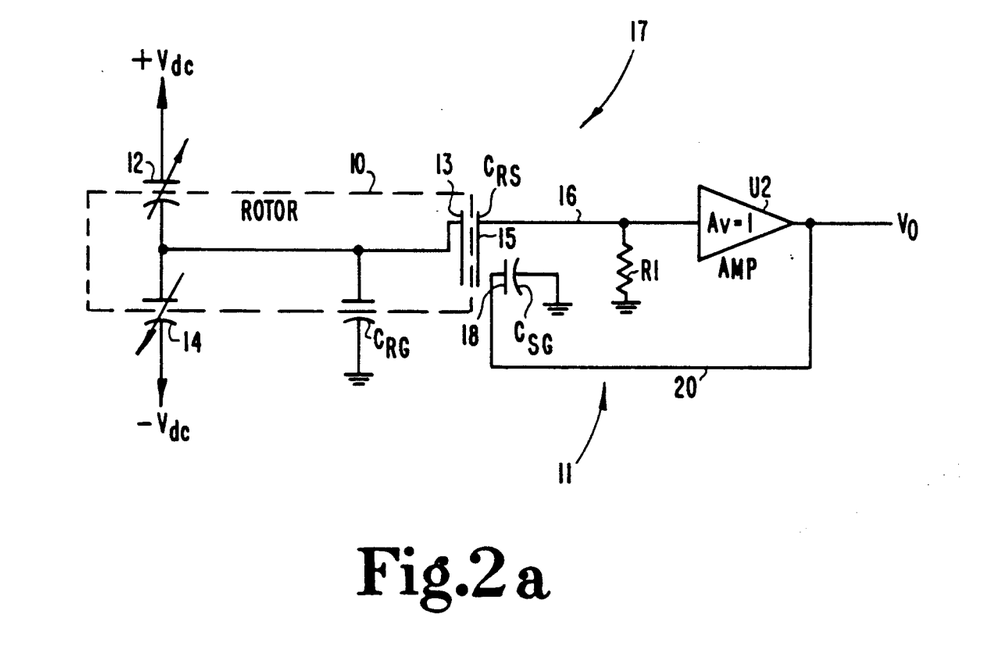
FIG. 2a is a schematic diagram of the improved angle resolver according to a typical embodiment of the present invention.

Referring now to FIG. 2a, a first embodiment of the improved angle resolver according to the present invention is shown. Improved angle resolver 17 includes a rotor 10 and a stator 11 as does the prior art device of FIG. 1. The rotor 10 of FIG. 2a is identical to the rotor 10 of FIG. 1. Variable capacitors 12 and 14 perform an identical function, as does rotor coupling surface 13. Surfaces 13 and 15 together form capacitor $C_{RS}$ as in the prior art. The addition of stator shield 18 interposed between stator coupling surface 15 and the lower potential plate of capacitor $C_{SG}$ electrostatically counteracts the presence of the ground plate of capacitor $C_{SG}$. This is accomplished by supplying a signal 20 from amplifier U2 having unity gain to stator shield 18, thereby forcing stator shield 18 to have the same charge potential and phase as stator coupling surface 15. As stator coupling surface 15 and stator shield 18 are both at the same charge potential, the effective shunt capacitance $C_{SG}$ is reduced by a factor of $1/(G-1)$, where G is the open loop gain of the amplifier. A typical open loop gain value for an operational amplifier is upwards of 100,000. Charge loss from stator coupling surface 15 to the ground plate of capacitor $C_{SG}$ is minimized accordingly. By eliminating charge loss at stator coupling surface 15, the quality of signal 16 is improved and its amplitude is increased thereby raising the signal to noise ratio of the angle resolver output signal $V_O$. Thus, $V_O$ will be a higher quality signal in this embodiment than $V_O$ of FIG. 1.

As in the prior art of FIG. 1, R1 of FIG. 2a simply provides an input current bias path to ground for input bias currents generated by amplifier U2. Amplifier U2 would typically be an operational amplifier such as an LF412 manufactured by National Semiconductor, 2900 Semiconductor Drive, Santa Clara, Calif. 95052-8090.

Some charge loss from rotor coupling surface 13 still occurs due to capacitor $C_{RG}$, depending upon the size of the ground plate of $C_{RG}$ and the distance from the rotor to the ground plate of $C_{RG}$ as is commonly known according to formulas for determining capacitance. However, an immediate improvement in signal quality and thus higher resolution of the angle resolver is achieved by feeding a signal back to stator shield 18 and eliminating capacitor $C_{SG}$ as a source of signal attenuation. It should also be noted that economically, the stator shield concept is easily implemented by constructing the stator components on double-sided printed circuit boards using modern photolithographic registration and electrode etching manufacturing processes.

Figure 2B:
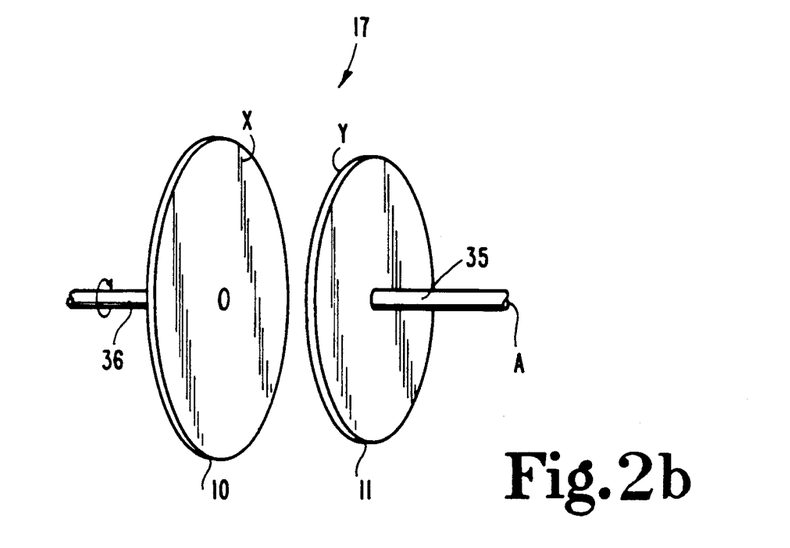
FIG. 2b is a diagrammatic illustration of the improved angle resolver according to a typical embodiment of the present invention.

Referring now to FIG. 2b, a diagrammatic illustration of the angle resolver 17 conceptually illustrates the position of rotor 10 with respect to stator 11. Surface X of rotor 10 and surface Y of stator 11 include metallic components which electrostatically interact to form the capacitors $C_{RS}$, 12, and 14 of FIG. 2a. Rotor 10 is rigidly attached to a rotating shaft 36. Stator 11 is held in fixed position by shaft 35, and shaft 35 is anchored at end A. In a typical embodiment surfaces X and Y are located in relatively close proximity to one another, with approximately 0.020 to 0.050 inches of air therebetween.

Figure 2C:
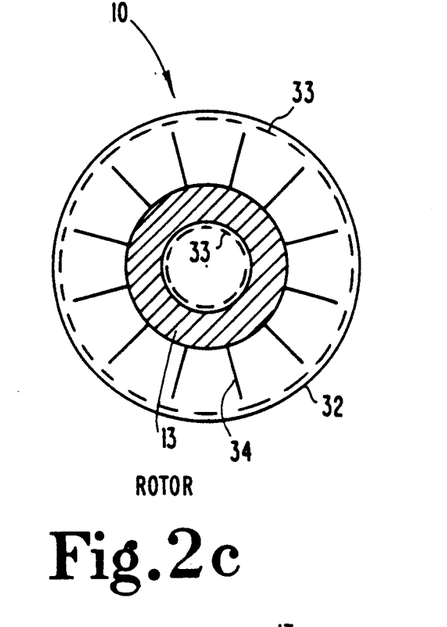
Figure 2D:
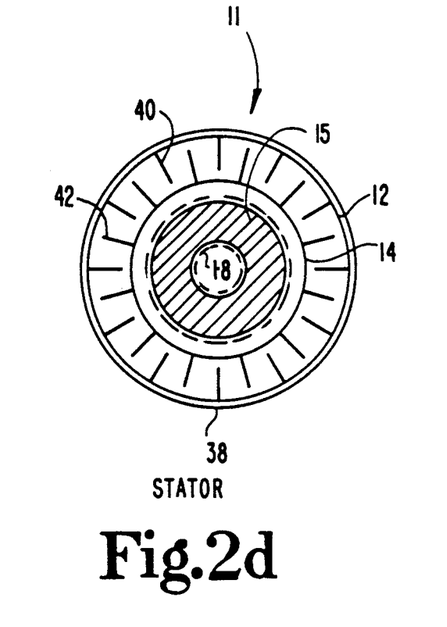

Referring now to FIG. 2c and 2d, a front elevation of the rotor 10 and stator 11 of the angle resolver 17 of FIG. 2b are shown. The surfaces shown are those surfaces that are normally in opposition to each other to create the capacitive plates necessary for the resolver 17 function. Rotor 10 of FIG. 2c is shown with surface X of FIG. 2b exposed, and stator 11 of FIG. 2d is shown with surface Y of FIG. 2b exposed for ease in describing the schematic components present on these surfaces.

The rotor 10 of FIG. 2c includes rotor coupling surface 13, which is electrically connected to rotor vanes 34. Double-sided circuit board 32 is shown on which the rotor components are created. Capacitive rotor coupling surface 13 and rotor vanes 34 are copper foil patterns etched into one side of printed circuit board 32. The rotor shield 33, shown by a dotted line, is etched into the back side of the circuit board 32.

Stator 11 of FIG. 2d is also constructed on a double-sided printed circuit board 38 having patterns etched into the copper foil on both sides of the circuit board 38. Positive interdigitations 40 interact with vanes 34 of FIG. 2c, thereby creating variable capacitor 12 of FIG. 2a. Negative interdigitations 42 react with vanes 34 of FIG. 2c, as rotor 10 rotates to create variable capacitor 14 of FIG. 2a. Stator shield 18 is etched into the back side of circuit board 38 shielding stator coupling surface 15 from nearby ground potential metallic objects. By constructing the rotor and the stator on printed circuit boards, the shielding is accomplished at a distance no greater than the thickness of the circuit board which is typically 0.030 to 0.050 inches. Additionally, the costs of manufacture are lowered by constructing the rotor and the stator on double-sided printed circuit boards.

Referring now to both FIGS. 2c and 2d, as the rotor vanes 34 pass across positive interdigitations 40 and subsequently pass or lie above negative interdigitations 42, the electrostatic signal on the rotor 10 varies periodically. In a typical device, the number of vanes 34 will correspond to the number of interdigitations 40 and the number of interdigitations 42, thereby producing the maximum electrostatic voltage swing as the vanes 34 pass from a position directly over interdigitations 40 to a position over interdigitations 42. Rotor coupling surface 13 when operationally oriented directly opposite stator coupling surface 15 forming the capacitor $C_{RS}$ as shown in FIG. 2a, provides a signal coupling means for transmitting the charge potential of rotor 10 to the stationary stator coupling surface 15.

Figure 3A:
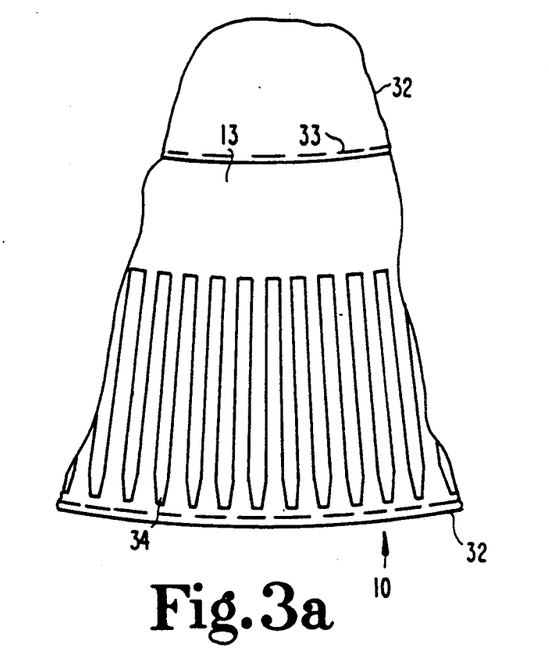
FIG. 3a is a partial plan view of the copper patterns etched in a circuit board defining the rotor of the present invention.
Figure 3B:
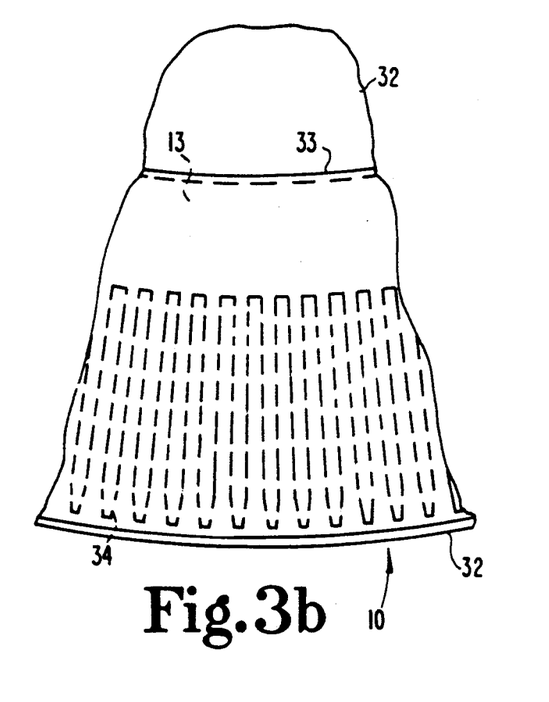

Referring now to FIGS. 3a and 3b, front and rear views of a section of a circuit board forming a rotor 10 are shown. The rotor portion of variable capacitors 12 and 14 of FIG. 2a are depicted by vanes 34 etched into the surface of circuit board 32. Rotor coupling surface 13 is an annular metallic ring connected electrically to each of the rotor vanes 34. Rotor shield 33, bounded by the dotted line and shown in FIG. 3b (on the back of circuit board 32), provides a shield for rotor vanes 34 in another embodiment described infra. The rotor coupling surface 13 and rotor vanes 34 of rotor 10 in FIG. 3b are bounded by dotted lines and shown for descriptive purposes to aid in understanding the position of shield 33 with respect to other elements of the rotor 10.

Figure 4A:
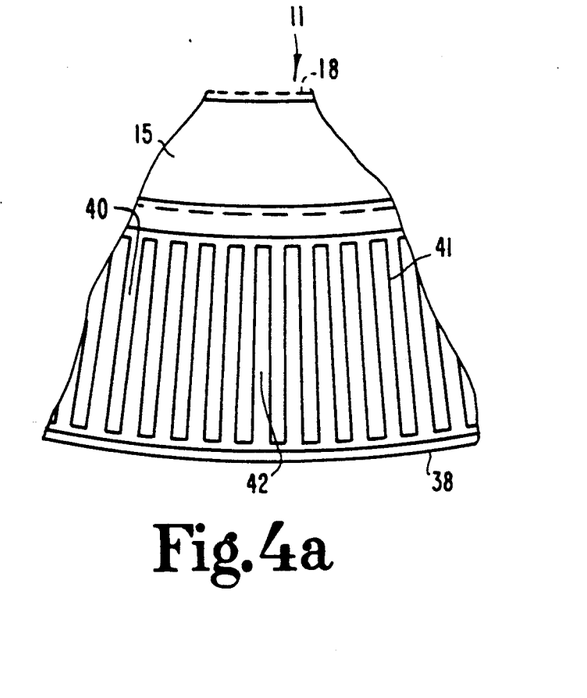
FIG. 4a is a partial plan view of the copper patterns etched in a circuit board defining the stator of the present invention.
Figure 4B:
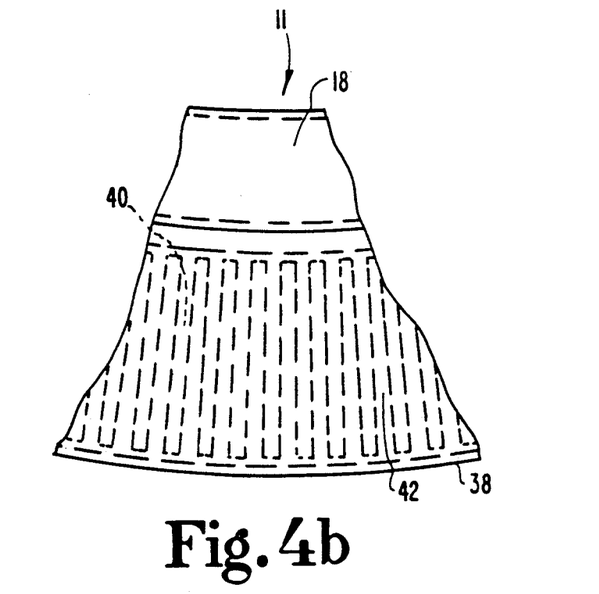
FIG. 4b is the back side of the printed circuit board shown in FIG. 4a showing the stator and shield of the present invention.

Referring now to FIGS. 4a and 4b, both sides of a section of the stator 11 according to the present invention are shown. The elements of the stator 11 are etched into circuit board 38 to form the capacitive plates and coupling surfaces described as follows: positive interdigitations 40 comprise the positive or stator plate of variable capacitor 12, which is connected to a positive DC voltage as shown in FIG. 2a; negative interdigitations 42 form the stator plate of variable capacitor 14 of FIG. 2a, which is connected to negative DC voltage. The angular spacing of the interdigitations 40 and 42 angularly mirrors that of the rotor electrodes of FIG. 3a, such that the rotor electrodes 34 of FIG. 3a will lie opposite either the positive interdigitations 40 or negative interdigitations 42, depending upon the angular position of the rotor 10 of FIG. 3a when placed in opposition to stator 11 of FIG. 4a.

Rotor coupling surface 13 of FIG. 3a is opposed by stator coupling surface 15 of FIG. 4a, thereby forming capacitor $C_{RS}$ of FIG. 2a. As rotor 10 of FIG. 3a rotates, the vanes or electrodes 34 of the rotor 10, will align periodically with either positive interdigitations 40 or negative interdigitations 42, depending upon the angular position of rotor 10. An insulator 41 or bare area etched away in the copper foil of circuit board 38 defines and electrically insulates interdigitations 40 from 42.

In a periodic fashion, the charge produced at rotor coupling surface 13 of FIG. 2a varies from positive to negative, depending upon the position of rotor vanes 34 with regard to stator positive and negative interdigitations 40 and 42, respectively. The rotor coupling surface 13 is electrostatically coupled to stator coupling surface 15 shown in FIG. 4a. Stator shield 18, bounded by the dotted line in FIG. 4a and shown in FIG. 4b (on the back side of the circuit board of FIG. 4a), provides the shielding protection necessary to prevent loss of charge from stator coupling surface 15 to nearby metallic objects at or near ground potential, thus preventing and perhaps eliminating charge loss from the stator coupling surface. As would be obvious to one skilled in the art, the physical positioning and shape of stator shield 18 can be varied in order to maximize the charge loss protection accorded by this shielding device.

Figure 5:
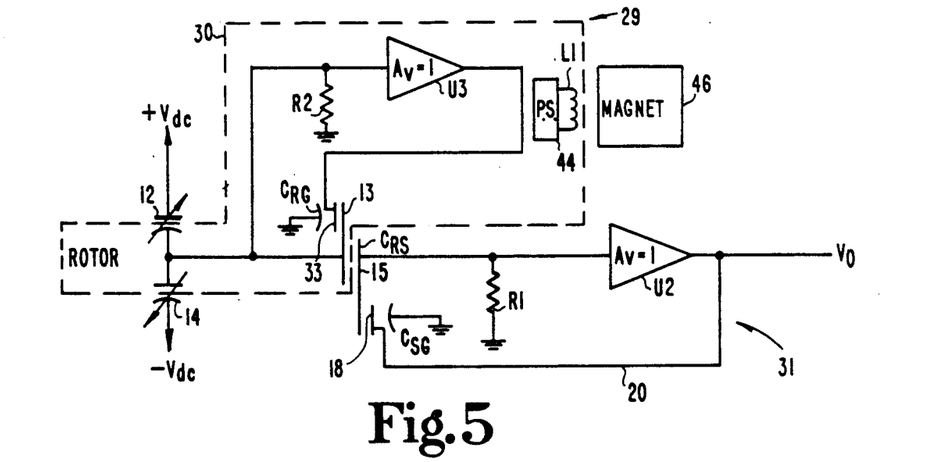
FIG. 5 is a schematic diagram of a second embodiment of the present invention showing a shield on the stator and a shield on the rotor with a power supply mounted on the rotor.

Referring now to FIG. 5, improved electrostatic angle resolver 29 comprising a second embodiment according to the present invention is shown. Rotor 30 is comprised of capacitive plates forming half of capacitors 12 and 14, amplifier U3 connected to the capacitive plates of variable capacitors 12 and 14, R2 for the input bias currents of amplifier U3, power supply 44 which supplies power to amplifier U3, coil L1, which is a source of an input signal for power supply 44, rotor coupling surface 13 and rotor shield 33 together with ground planes located nearby comprise capacitor $C_{RG}$. The stator 31 of FIG. 5 is comprised of the plates which make up the stator portions of variable capacitors 12 and 14, stator shield 18, bias resistor R1, amplifier U2 which produces signal $V_O$, and feedback path 20 connected to stator shield 18. Stator coupling surface 15 forms capacitor $C_{RS}$ with rotor coupling surface 13, and stator shield 18 forms capacitor $C_{SG}$, with nearby grounded objects (not shown). Permanent magnet 46 need not be constructed as a part of the stator, however magnet 46 must be statically fixed in position relative to rotor 30 so that coil L1, located at a radius on the rotor 30, passes in the near field of magnet 46 during rotation of rotor 30 thereby inducing a current to flow in coil L1 and providing an input signal for power supply 44. Of course a battery could be mounted on the rotor to substitute for power supply 44, but this might introduce mechanical imbalance and would introduce a finite operating lifetime to the sensor.

It is a necessity to generate power on the rotating rotor in order to supply power to amplifier U3, thereby providing a low output impedance signal source to supply a signal to rotor shield 33. As in a previous embodiment shown in FIG. 2a, rotor shield 33 performs an identical function as stator shield 18 in that it prevents charge loss from rotor coupling surface 13 to nearby grounded objects. A power source located on the rotor is thus needed to supply power to amplifier U3 and supply a source of current to rotor shield 33, thereby allowing implementation of an active shielding technique to eliminate the second interference with signal quality described earlier with regard to the prior art and the stray capacitance $C_{RG}$. A double-sided circuit board having copper on both sides as shown in FIG. 3a, 3b, 4a, and 4b, may be used to implement the embodiment according to the invention as shown in FIG. 5.

Rotor shield 33, as shown by a dotted line in FIG. 3a and a solid line in FIG. 3b, can be formed to shield not only the rotor coupling surface 13, but also the rotor vanes 34 forming the rotor plates of variable capacitors 12 and 14, thereby further eliminating possible charge losses to nearby ground plane objects.

Figure 6:
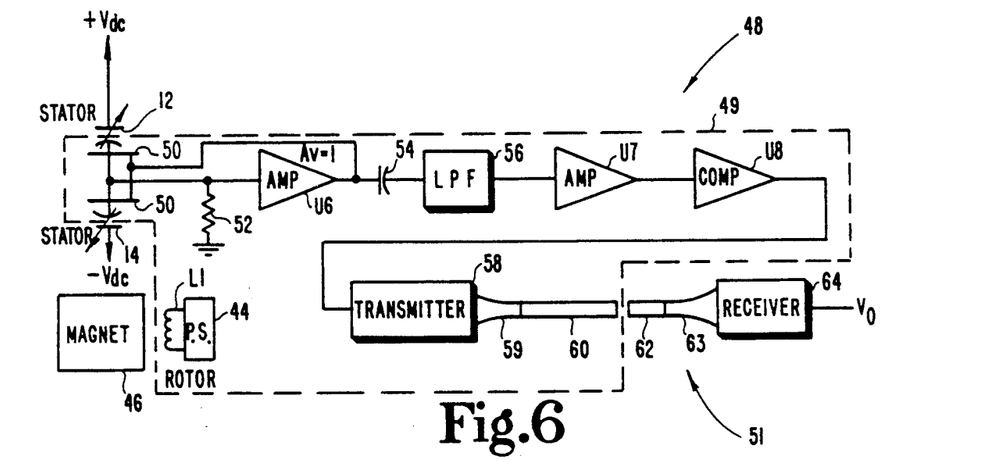
FIG. 6 is a schematic diagram of a third embodiment of the present invention showing an optical signal coupler between the rotor and stator and a shield for the rotor interdigitations.

Referring now to FIG. 6, a third embodiment of an angle resolver 48 according to the present invention is shown which includes optical means for transmitting position information from the rotor to the stator thereby eliminating the electrostatic coupling surfaces formerly referred to as the rotor coupling surface 13 and the stator coupling surface 15 of FIG. 5. The rotor 49, according to this embodiment, includes, as do the previous embodiments, variable capacitors 12 and 14, with the rotor plates of capacitors 12 and 14 connected to resistor 52 and the input of amplifier U6. The output of amplifier U6 is connected to rotor shield 50 shielding the rotor vanes 34 of FIG. 3a making up part of capacitors 12 and 14. Amplifier U6 supplies a signal to capacitor 54, and capacitor 54 decouples the signal. A low pass filter 56 filters the output of U6 to eliminate possible interference signals. The output of low pass filter 56 is connected to an input of amplifier U7, providing increased gain or voltage amplification of the signal appearing at the input to U7. Comparator U8 has the output from amplifier U7 applied to its input. Comparator U8 indicates the zero voltage cross-over points of the signal at its input by providing a square wave at its output. Optical transmitter 58 converts the signal from comparator U8 into an optical or light signal and by way of optical connector 59 and fiber optic cable 60, transmits the electrical information generated on the rotor 49 to stator 51. Power supply 44 located on the rotor supplies power to amplifier devices U6, U7, and U8. Rotor power supply 44 derives its input signal from the signal induced in coil L1, as it passes permanent magnet 46 as a result of the rotation of rotor 49.

The stator 51 includes optical cable 62, fiber optic connector 63 and optical receiver 64. Fiber optic cable 62 is located in such a position as to receive the light signal emanating from fiber optic cable 60. Fiber optic cable 62 is connected to fiber optic connector 63 and thereby providing the light signal to optical receiver 64, which converts the light signal into an electronic signal $V_O$.

Another possible signal coupling technique for transmitting the periodic position signal from the rotor to the stator, given an available source of power on the rotor, includes circuitry on the rotor for generating a magnetic field and corresponding circuitry on the stator for detecting a magnetic field. This technique would avoid electrostatic interference with the coupling of the signal from the rotor to the stator. Numerous magnetic signal coupling circuits well known in the art are contemplated as possible substitutes for the electrostatic coupling between the rotor and stator shown above.

Figure 7:
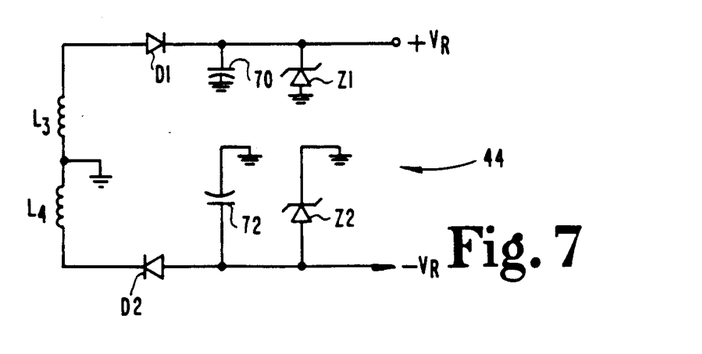
FIG. 7 is a schematic diagram showing one possible circuit configuration for a rotor mounted power supply according to the present invention.

Rotor power supply 44 of FIG. 6 may be implemented by the circuit shown in schematic form of FIG. 7. In this embodiment of the rotor power supply, two coils L3 and L4, arranged in reverse polarity, combine to supply a signal to D1 or D2 when coils L3 or L4, mounted on rotor 30 of FIG. 5, pass by permanent magnet 46. It should be noted that a number of magnets and coils may be used in order to arrive at the input signal for a power supply as is required by a particular embodiment of the invention.

Capacitors 70 and 72 store current received from diodes D1 and D2, respectively. Zenor diodes Z1 and Z2 act as regulators to limit the voltage produced by the power supply 44. Voltages $+V_R$ and $-V_R$ are power supply output signals and are supplied to the active devices residing on the rotor of the embodiments shown in either FIGS. 5 or 6.

What is claimed is:

1. An improved angle resolver comprised of:
   a stator adapted to be fixedly mounted adjacent to a rotating shaft, said stator having means for producing a patterned electrostatic field, said stator further including a stator coupling surface;
   a rotor adapted to be mounted on said rotating shaft, said rotor including a field pick-up surface responsive to and detecting an electrostatic potential as said field pick-up surface passes through said patterned electrostatic field, said rotor also including a rotor coupling surface situated adjacent to and electrostatically communicating with said stator coupling surface of said stator;
   stator shield means for at least partially shielding said stator coupling surface whereby said stator shield means is electrically insulated from and disposed in close proximity to said stator coupling surface;

stator circuit means for supplying a potential signal to said stator shield means, said stator circuit means having an input connected to said stator coupling surface and an output connected to said stator shield means, said stator circuit means producing a signal at said output proportional to the signal present at said stator circuit means input;

rotor shield means for electrostatically shielding said rotor, said rotor shield means at least partially shielding said rotor yet allowing said rotor coupling surface to electrostatically communicate with said stator coupling surface;

rotor circuit means for supplying a signal to said rotor shield means, said rotor circuit means having an input connected to said rotor coupling surface and an output connected to said rotor shield means, said rotor circuit means producing a signal at said output proportional to the signal present at said rotor circuit means input; and rotor power supply means for supplying power to said rotor circuit means, said rotor power supply means including at least one coil mounted at a radius on said rotor, a magnetic field source means fixedly located in near proximity to said rotor for producing a magnetic field, said rotor power supply means deriving an input signal from the electrical signal induced in said coil as said rotor rotates and said coil passes through said magnetic field, said rotor power supply means further including power supply circuit means for producing a dc power supply signal at a power supply circuit means output, said power supply circuit means output supplying a power signal to said rotor circuit means.

2. An improved angle resolver comprised of:

a stator fixedly mounted near a rotating member, said stator including electrostatic position sensing means having:
 (a) a stator electrostatic charge producing means for producing a patterned electrostatic field signal and
 (b) a stator electrostatic charge receiving means for receiving an electrostatic field signal;

a rotor removably attached to said rotating member and including:
 (a) rotor electrostatic charge receiving means for receiving said patterned electrostatic field signal and producing a potential signal; and
 (b) rotor electrostatic charge producing means for electrostatically transmitting said potential signal to said stator electrostatic charge receiving means, said rotor electrostatic charge producing means connected to said rotor electrostatic charge receiving means and said rotor electrostatic charge producing means positioned in opposition to said stator electrostatic charge receiving means;

a stator guard electrode at least partially shielding said stator;

stator circuit means for supplying a signal to said stator guard electrode, said stator circuit means including a first input connected to said stator electrostatic charge receiving means and a first output connected to said stator guard electrode, said stator circuit means producing a signal at said first output identical to the signal present at said first input;

a rotor guard electrode mounted on said rotor and electrically insulated from said rotor, said rotor guard electrode at least partially shielding said rotor;

rotor amplifier means mounted on said rotor for supplying a signal to said rotor guard electrode, said rotor amplifier means including a second input connected to said rotor electrostatic charge producing means and a second output connected to said rotor guard electrode, said rotor amplifier means producing a rotor guard shield signal at said second output identical to the signal present at said second input; and rotor power supply means mounted on said rotor for supplying power to said rotor amplifier means, said rotor power supply means including at least one pick-up coil mounted at a radius on said rotor and magnetic field means fixedly located at said radius near said rotor for producing a magnetic field, said rotor power supply means input connected to said at least one pick-up coil thereby deriving an induced input signal for said rotor power supply means when said rotor turns.

3. The improved angle resolver of claim 2 including rectifying circuit means for transforming said induced input signal into a power signal for supplying power to said rotor amplifier means.

4. The improved angle resolver of claim 3 wherein said stator circuit means is a voltage follower circuit.

5. The improved angle resolver of claim 4 wherein said voltage follower circuit has a high input impedance and a low output impedance.

6. The improved angle resolver of claim 5 wherein said stator circuit means and said rotor amplifier means are both voltage follower circuits with high input impedance and low output impedance.

7. The improved angle resolver of claim 6 wherein said rotor power supply means includes first and second coils mounted on said rotor, said first and second coils connected to each other yet positioned in opposite polarity with respect to said magnetic field means so as to sum the signals induced in each coil, said rotor power supply means further including first and second diodes, said first diode having its anode connected to the remaining lead of said first coil, and said second diode having its cathode connected to said second coil, said rotor power supply means also including a first voltage regulator means connected to the cathode of said first diode for producing at an output of said first regulator means a positive voltage dc signal, said rotor power supply means further including a second voltage regulator means connected to the anode of said second diode for producing at the output of said second voltage regulator means a negative voltage dc signal, said outputs of said first and said second voltage regulator means connected to said rotor amplifier means.

8. The improved angle resolver of claim 7 wherein said magnetic field means is a permanent magnet mounted at said radius near said rotor so that said coils pass near the magnetic field produced by said magnet when said rotor rotates.

9. The improved angle resolver of claim 8 wherein said magnetic field means is a rotary transformer apparatus positioned in near proximity to said rotor, said rotary transformer producing a time changing magnetic field for inducing a current to flow in said at least one pick-up coil.

* * * * *

UNITED STATES PATENT AND TRADEMARK OFFICE
CERTIFICATE OF CORRECTION

PATENT NO. : 4,998,103

DATED : March 5, 1991

INVENTOR(S) : Mark A. Rosswurm, et al.

It is certified that error appears in the above-identified patent and that said Letters Patent is hereby corrected as shown below:

In the Abstract, in line 1, please delete the word "has" and insert in lieu thereof --is disclosed including--;

In the Abstract, in line 3, please delete the word "a";

In the Abstract, in line 3, please insert the word --means-- after the word "coupling".

Signed and Sealed this

Twenty-first Day of July, 1992

*Attest:*

DOUGLAS B. COMER

*Attesting Officer*     *Acting Commissioner of Patents and Trademarks*